W. H. ELLIOT.
Revolver.
No. 2,650. Reissued June 18, 1867.
Fig. 1.
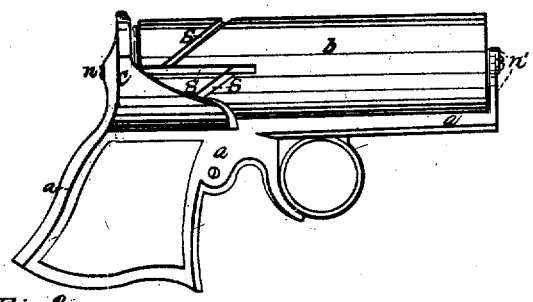
Fig. 2.
Fig. 3.
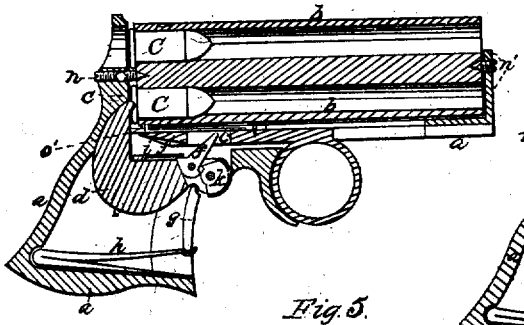
Fig. 4.
Fig. 5.
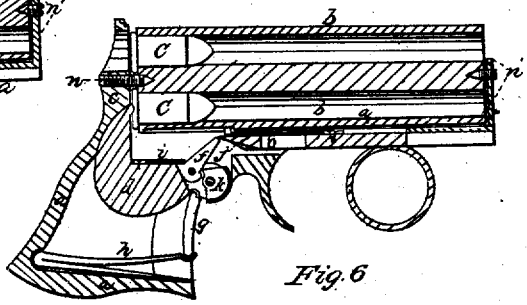
Fig. 6
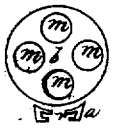
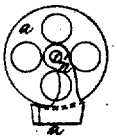
Fig. 7.
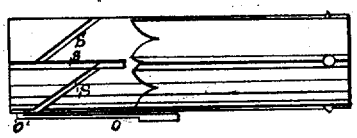
Fig. 9.
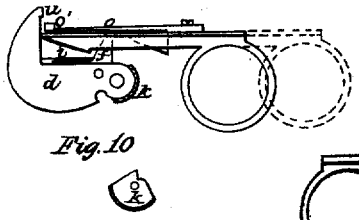
Fig. 8
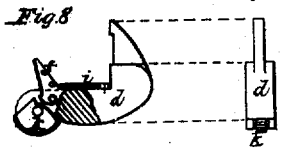
Fig. 10
Fig. 11
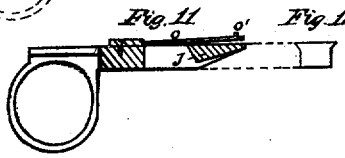
Fig. 12.
Fig. 13.
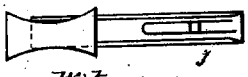
Witnesses.
R. H. Campbell
Edw. Schupp
Inventor
W. H. Elliot
by
Mann, Fenwick & Lawrence
N. PETERS, PHOTO-LITHOGRAPHER, WASHINGTON, D. C.

UNITED STATES PATENT OFFICE.

WILLIAM H. ELLIOT, OF PLATTSBURG, NEW YORK.

IMPROVEMENT IN REVOLVING FIRE-ARMS.

Specification forming part of Letters Patent No. 28,461, dated May 29, 1860; Reissue No. 2,650, dated June 18, 1867.

*To all whom it may concern:*

Be it known that I, WILLIAM H. ELLIOT, of Plattsburg, in the county of Clinton and State of New York, have invented a new and Improved Pistol; and I do hereby declare that the following is a full, clear, and exact description thereof, reference being had to the accompanying drawings, making a part of this specification, in which—

Figure 1 is a side view of the improved pistol. Fig. 2 is a longitudinal section taken vertically through the center of the pistol, with the trigger drawn fully back. Fig. 3 is a similar view of the same parts, with the trigger moved forward to its fullest extent. Fig. 4 is a cross-section taken through the barrels and frame. Fig. 5 is a view of the front end of the chambered cylinder and forward support. Fig. 6 is an elevation of the barrels and the spring which revolves the same. Fig. 7 is a side view of the lock and revolving spring. Figs. 8, 9, 10, 11, 12, and 13 are views of the several parts forming the lock in detail.

Similar letters of reference indicate corresponding parts in the several figures.

The object of this invention is to produce a powerful, though very compact, pocket-pistol, which shall possess great strength and durability.

It consists, in part, in the employment, in conjunction with chambers which are bored through at their rear ends, and a breech-plate which admits of the introduction of the cartridges into the rear ends of said chambers, of a hammer which is arranged in such relation to the barrels that its exploding point or nose strikes up in rear of said chambers, and its axis of motion is forward of the rear ends thereof, as will be hereinafter described.

It further consists in an auxiliary support for the barrels, which is located forward of the rear end of the same, and which is employed in conjunction with a rear central support for the barrels, the latter being bored through, so as to receive the cartridges at their rear ends, as will be hereinafter described.

It also consists in so combining a hammer and a breech-plate with barrels which are bored entirely through that the breech-plate will be partially or wholly relieved from the pressure of the cartridge shell or shells after explosion, as will be hereinafter explained.

It also consists in a novel and efficient mode of operating the hammer for exploding the pistol; also, in a mode of replacing the trigger without firing after it has been moved forward, as will be hereinafter set forth.

To enable others skilled in the art to understand my invention, I will now describe one practical mode of carrying it into effect.

In the accompanying drawings, *a* represents the frame of the pistol; *b*, barrels, which are bored through and left open at their rear ends for the purpose of being charged at the breech.

*c* is the breech-plate, which, when employed with cartridges such as are shown in the drawings, serves the purpose of a breech-pin or check.

*d* is the hammer, which is pivoted underneath and forward of the rear ends of the chambers or barrels, while its exploding point or nose strikes up in the rear of said chambers or barrels.

*f* is the fly upon which the trigger acts to raise the hammer.

*g* is the stirrup between the hammer and mainspring.

*h* is the mainspring; *i*, the fly-spring; *j*, a cam or wedge upon the trigger for raising the hammer; and *k* is the fly-lever for depressing the fly, so that the trigger may be moved back without raising the hammer.

C are the cartridges, (shown within the chambers *m m*,) and *n* is the rear support for the barrels. *n'* is the front support for the barrels, extending up from the horizontal portion of the frame; *o*, the revolving spring, which is fastened to and moves with the sliding trigger.

*o'* is a stud or projection upon the rear end of the spring *o*, which works in the revolving grooves S upon the barrels. *r* are the grooves in the frame, in which the trigger slides.

S are the revolving grooves in the outer surface of the barrels.

The operation of my pistol is as follows: It is intended, when the pistol is carried in the pocket, that the trigger should occupy the position in which it is represented in Fig. 2; but when it becomes necessary to fire it the finger is placed in the ring and the trigger pushed forward to the position represented in Fig. 3. As it moves forward the heel of the wedge strikes the back of the fly, depressing it toward the front, and passing completely under it. When the fly, by the power of the spring *i*, assumes its original position in drawing the trigger back to fire the pistol, the toe of the wedge strikes the fly, carrying it back, and as the trigger continues its motion backward the end of the fly passes up the inclined plane of the wedge, and when the fly arrives at the heel of the wedge the hammer stands at full-cock, when it may be fired by continuing the motion of the trigger backward; or it may be let down without firing by allowing the trigger to pass forward, which it will do by the power of the mainspring. As the revolving spring *o* is carried back and forth by the trigger the projection *o'* passes in one direction in the parallel grooves and in the other direction in the diagonal grooves S, causing the barrels to revolve, so as to bring another cartridge under the hammer with each backward and forward movement of the trigger.

To replace the trigger without firing, after it has been pushed out, the fly must be depressed, so as to allow the trigger to pass backward without raising the hammer. To do this the lower side of the fly-lever *k* must be pushed forward by the finger, when the fly will be depressed sufficiently to effect the object.

A hammer arranged as before stated—viz., with its pivoted end attached to the pistol at some point forward of the rear end of the chambers or barrels, while its point or nose strikes upward in rear of said chambers—operates in a peculiar manner, as by this arrangement of these devices the nose of the hammer penetrates a little into the cartridge and at the moment of the discharge holds onto it like a hook, and this prevents it from being thrown back against the breech-plate with so much force as to interfere with the revolution of the barrels; and this arrangement is essential, not only to revolving pistols, but to any pistol in which the cartridge and the breech-plate change their position in relation to each other between the discharges, as in any case the full recoil and consequent strain of several cartridges against a breech-plate would interfere with their motions.

When a hammer is thus employed and arranged in combination with a breech-plate its operation is as follows, viz: At the moment the discharge takes place the exploding point or nose of the hammer resting upon the rim of the cartridge resists so much of the recoil that the center of the head of the cartridge is swelled out till it touches the breech-plate. When the strain upon it is passed the slight elasticity there is in the shell of the cartridge causes it, to a certain extent, to assume its original form, drawing away from the breech-plate that portion of the head of the cartridge which at the moment of discharge rested against it.

By employing this means of preventing the cartridge from pressing against the breech-plate the chambers may be made small enough to fit snugly around the shell, and thus prevent a discharge of gas in the rear. When no such means of preventing the shell from resting against the breech is employed it is necessary that the chambers be made large enough, so that the shell will move forward loosely away from the breech-plate. Such chambers allow a large escape of gas in the rear.

The employment of a hammer arranged as shown in the drawings, and as hereinbefore specified, in relation to the barrels, with chambers bored through the rear end and with a breech-plate, is an important improvement, as a degree of compactness is obtained by this combination that could not possibly be had without it.

A hammer arranged with its joint or pivot forward and its exploding point or nose swinging down into the frame of the pistol, as shown in the drawings, when employed with chambers having breech-pins and nipples, makes a very compact pistol; but when a hammer so arranged is employed, as specified, and the breech-pin and nipples dispensed with, all the room they occupied is added to the length of the barrel without increasing the length of the pistol. Either this arrangement of the hammer or the employment of chambers bored through with a breech-plate, when used separately, tends greatly to compact a pistol; but when these two conditions are employed together a still greater degree of compactness is effected than would result from the use of either one of them alone. When a series of barrels are bored through at their rear ends for the purpose of being loaded at the breech they are very much weaker in every respect than those which are not bored through, or than those which are filled with a breech-pin, particularly if, in addition to being bored through, they are chambered out for the reception of a cartridge. When a base-pin is employed for such barrels to revolve upon it is important that the center hole should be much larger in the rear than in the front end, so that the base-pin may be largest at its point of support; and to give sufficient strength to the chambers it is necessary to put a greater weight of metal in the barrels than would otherwise be required; but by employing the support *n* and the auxiliary support *n'*, in conjunction with barrels which are bored through at their rear ends, they may be made as light and compact as they could be if they were not bored through and a base-pin were employed.

The employment of wedge or cam *j* for raising the hammer has peculiar advantages, inasmuch as it allows the required length of motion of the trigger, and at the same time lifts upon the cock, through the fly, with great force, thus making a powerful and closely-compact arrangement of devices for raising the hammer. Where a cylinder of revolving barrels is bored entirely through, so as to be charged in the rear, so much of the rear end of the cylinder of barrels is cut away in making the chambers that there is not room within the circle of chambers on the end of the cylinder for a base-pin of the ordinary size and strength and a ratchet also; but a very small base-pin, bearing, or support may be employed, when there is also employed an auxiliary support forward of the rear ends of the chambers, and make a practical arm.

I have represented in the drawings one form of auxiliary support arranged at the front end of the cylinder of barrels; but it is obvious that this form and location of auxiliary support may be changed and modified without changing the principle of my invention.

I make no broad claim to the arrangement of a hammer which is pivoted below and forward of the rear end of the chamber, while its exploding point or nose strikes up in the rear of said chamber, as this was patented by V. M. Wallace August 17, 1835; nor do I in this application make the broad claim of resisting the recoil of a cartridge by a hammer so arranged.

Having described my invention, what I claim as new, and desire to secure by Letters Patent, is—

1. A fire-arm with revolving barrels which are bored through and chambered so as to be charged at the breech, and sustained by two supports, to wit: one point of support being at the center of the breech-plate, or at the rear of the breech-loading chambers, and the other forward of said chambers, such construction of barrels and supports obviating the use of a pin passing through the cluster of barrels, of sufficient strength alone to support the same, substantially as set forth.

2. The arrangement of support *n* in the rear of all the barrels and support *n'* in front of all the barrels, in combination with a series of revolving barrels which are bored through at their rear ends for the purpose of being charged at the breech, substantially as set forth.

3. The employment of a hammer arranged as specified in relation to the barrels, when used independent of a breech-pin or nipple, and in combination with chambers bored through at their rear ends, and with a breech-plate, substantially as specified.

4. The combination of a wedge or cam, *j*, with a fly, *f*, for raising the hammer, substantially as specified.

W. H. ELLIOT.

Witnesses:
S. L. ELLIOT,
THEODORE M. TUTHILL.